(12) United States Patent
Mahar et al.

(10) Patent No.: US 10,382,375 B2
(45) Date of Patent: Aug. 13, 2019

(54) PERSONALIZED COMMUNICATIONS

(71) Applicant: Vivint, Inc., Provo, UT (US)

(72) Inventors: Matthew Mahar, Salt Lake City, UT (US); Matthew J. Eyring, Provo, UT (US); Clint Huson Gordon-Carroll, Orem, UT (US); Jeremy B. Warren, Draper, UT (US); James Ellis Nye, Alpine, UT (US); Jefferson Huhta Lyman, Alpine, UT (US)

(73) Assignee: Vivint, Inc., Provo, UT (US)

( * ) Notice: Subject to any disclaimer, the term of this patent is extended or adjusted under 35 U.S.C. 154(b) by 464 days.

(21) Appl. No.: 14/629,174

(22) Filed: Feb. 23, 2015

(65) Prior Publication Data
US 2016/0248725 A1    Aug. 25, 2016

(51) Int. Cl.
*G06F 15/16* (2006.01)
*H04L 12/58* (2006.01)
(Continued)

(52) U.S. Cl.
CPC .......... *H04L 51/14* (2013.01); *H04L 12/2803* (2013.01); *H04L 12/2805* (2013.01); *H04L 51/043* (2013.01); *H04L 63/0861* (2013.01)

(58) Field of Classification Search
CPC .... H04M 11/04; H04L 12/282; H04L 67/025; H04L 12/2803; H04L 12/2805; H04L 12/2809; H04L 12/2818; H04L 12/2829; H04L 12/2838; H04L 67/22; H04L 67/306; H04L 2012/2841; H04L 51/043; H04L 51/14; H04L 63/102; H04L 67/18; H04L 63/08; H04L 63/083; H04L 63/0861; H04W 12/08; H04W 4/001; H04W 4/04
(Continued)

(56) References Cited

U.S. PATENT DOCUMENTS 7,130,383 B2    10/2006  Naidoo et al.
7,263,073 B2     8/2007  Petite et al.
(Continued)

FOREIGN PATENT DOCUMENTS

KR    1020010086799 A    9/2001
KR    1020130021141 A    3/2013
(Continued)

OTHER PUBLICATIONS

PCT International Search Report for International Application No. PCT/US2016/014910, dated Jun. 13, 2016 (3 pp.).

*Primary Examiner* — Dustin Nguyen
*Assistant Examiner* — Hao H Nguyen
(74) *Attorney, Agent, or Firm* — Holland & Hart, LLP

(57) ABSTRACT

In some embodiments, security and/or automation systems, collectively referred to as automation systems, may facilitate communications between a remote user and an occupant of a residence. The automation system may receive one or more communications from a user and deliver the communication to the specified recipient when the recipient occupies the residence. The automation system may determine the recipient is proximate the residence and may notify the recipient of the pending communication. The recipient may use the control panel or another device associated with the security and/or automation system to receive the message.

11 Claims, 7 Drawing Sheets

(51) Int. Cl.
*H04L 12/28* (2006.01)
*H04L 29/06* (2006.01)

(58) Field of Classification Search
USPC ..... 709/206, 217, 224; 340/5.52, 5.53, 5.74, 340/7.52, 506, 517, 539.13; 379/37, 38, 379/42; 700/90, 286, 300
See application file for complete search history.

(56) References Cited

U.S. PATENT DOCUMENTS

| | | | | |
|---|---|---|---|---|
| 8,456,293 | B1* | 6/2013 | Trundle | G08B 21/0423 340/517 |
| 8,705,701 | B2 | 4/2014 | Bennett, III et al. | |
| 2002/0125993 | A1* | 9/2002 | Gutta | G06Q 10/107 340/5.52 |
| 2006/0190590 | A1* | 8/2006 | Kim | H04L 12/282 709/224 |
| 2008/0079558 | A1* | 4/2008 | Dorgelo | G05B 19/406 340/506 |
| 2008/0221715 | A1* | 9/2008 | Krzyzanowski | H04L 12/2805 700/90 |
| 2010/0023865 | A1 | 1/2010 | Fulker et al. | |
| 2010/0321152 | A1* | 12/2010 | Argudyaev | G06K 9/00046 340/5.53 |
| 2012/0226768 | A1* | 9/2012 | Gaines | G06F 19/3418 709/217 |

FOREIGN PATENT DOCUMENTS

| | | |
|---|---|---|
| KR | 1020130107555 A | 10/2013 |
| KR | 1020140089227 A | 7/2014 |

\* cited by examiner

PERSONALIZED COMMUNICATIONS

BACKGROUND

The present disclosure, for example, relates to security and/or automation systems, and more particularly to the delivery of customized communications to personnel using the security and/or automation system.

Security and automation systems are widely deployed to provide various types of communication and functional features such as monitoring, communication, notification, and/or others. These systems may be capable of supporting communication with a user through a communication connection or a system management action.

People may wish to send communications to specific individuals. People may use social media, mobile devices, or email to deliver these communications. However, some recipients may not have access to these forms of communications. A recipient may not have a mobile device or a method of accessing their messages when they are remote from a computer.

SUMMARY

In some embodiments, security and/or automation systems, collectively referred to as automation systems, may facilitate communications between a remote user and an occupant of a residence. The automation system may receive one or more communications from a user and deliver the communication to the specified recipient when the recipient occupies the residence. The automation system may determine the recipient is proximate the residence and may notify the recipient of the pending communication. The recipient may use the control panel or another device associated with the security and/or automation system to receive the message.

A method for security and/or automation systems for a residence is described. The method may comprise receiving a request to compile a communication, wherein the request comprises a delivery medium, a designated recipient, and a delivery time. The communication may be compiled based at least in part on the receiving. The compiled communication may be delivered to the designated recipient when the designated recipient is proximate the residence based at least in part on one or more delivery triggers.

The method may further comprise determining a presence of the designated recipient prior to delivering the communication based at least in part on the determining. The notifying may comprise sounding a notification through the automation system. The confirmation of the delivery may be provided to a requestor of the communication. The communication may be personalized based at least in part on one or more personalization parameters.

In some embodiments, the method may comprise playing, immediately, the communication to a known occupant of the residence. Input may be received to the communication. Additionally, the method may comprise forwarding the communication to a device associated with the recipient. A response from the recipient may be sent to a requestor of the communication. The response may be selected from a generic list of responses. The response may be sent to a device associated with the requestor. The communication may be played on a control panel associated with the automation system.

In another embodiment, an apparatus for security and/or automation systems may be described. The apparatus may include a processor, memory in electronic communication with the processor, and instructions stored in the memory. The instructions may be executable by the processor to receive a request to compile a communication, wherein the request comprises a delivery medium, a designated recipient, and a delivery time. The instructions may be executable to compile the communication based at least in part on the receiving and deliver the compiled communication to the designated recipient when the designated recipient is proximate the residence based at least in part on one or more delivery triggers.

In another embodiment, a non-transitory computer-readable medium storing computer-executable code is described. The code may be executable by a processor to receive a request to compile a communication, wherein the request comprises a delivery medium, a designated recipient, and a delivery time. The code may be executable by a processor to compile the communication based at least in part on the receiving and deliver the compiled communication to the designated recipient when the designated recipient is proximate the residence based at least in part on one or more delivery triggers.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

In some embodiments, security and/or automation systems, collectively referred to as automation systems, may facilitate communications between a remote user and an occupant of a residence. The user may request one or more personalized communications to be delivered to an occupant of the residence. The recipient may be proximate the residence when the communication is delivered. The recipient may be notified of the pending communication. The recipient may use the control panel or another device associated with the automation system to receive the message.

The communication may be personalized. For example, the communication may comprise one or more personalization parameters such as background music, voice overs, songs, or the like. The communication may additionally play on one or more devices associated with the automation system. For example, the communication may play on a sound system, TV system, or the like. The communication may additionally comprise playback features. For example, the communication may play at a specific time or in conjunction with a specific person.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
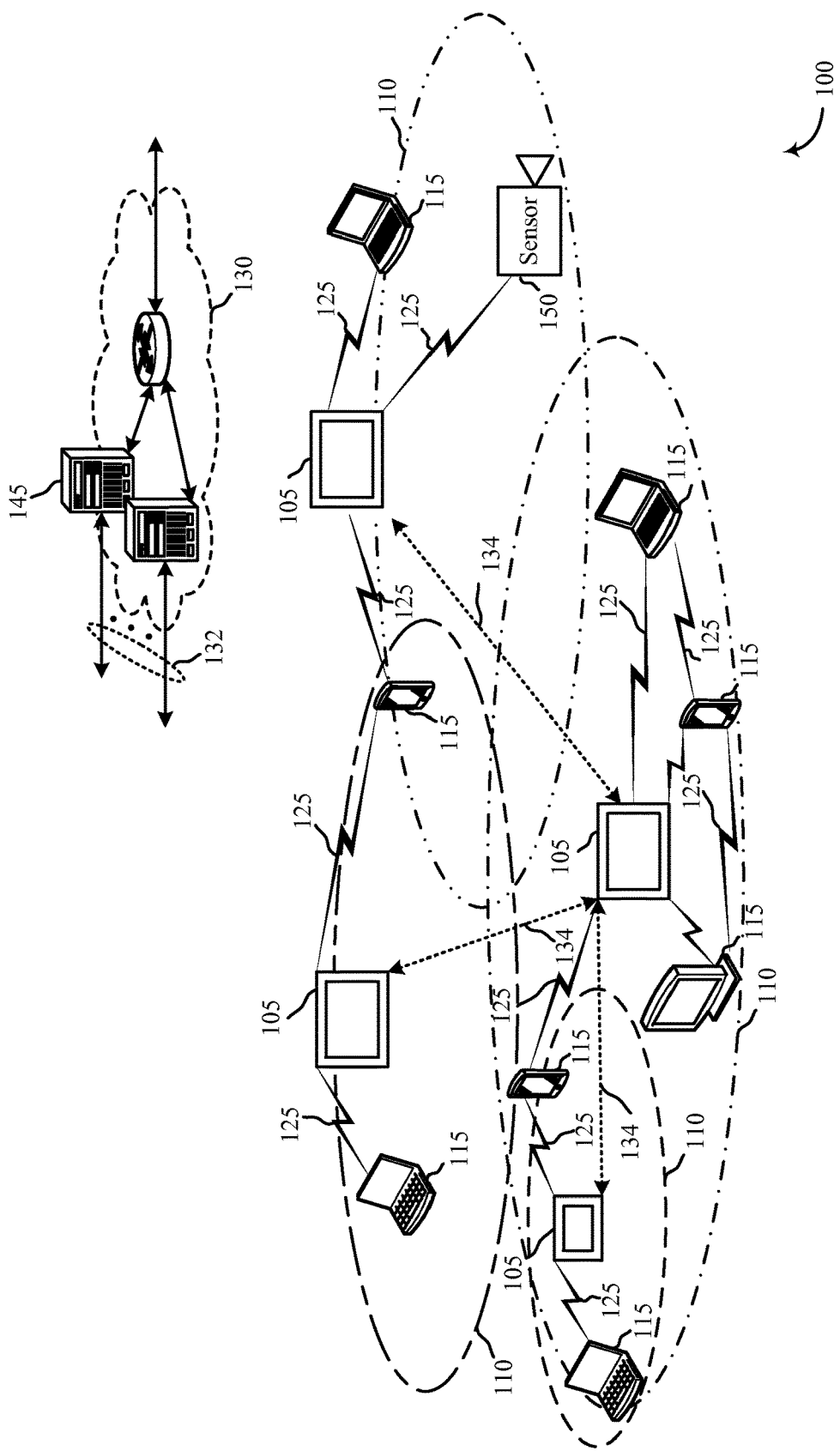
FIG. 1 shows a block diagram relating to a security and/or an automation system, in accordance with various aspects of this disclosure.

FIG. 1 illustrates an example of a communications system 100 in accordance with various aspects of the disclosure. The communications system 100 may include control panels 105, devices 115, a network 130, and/or sensors 150. The network 130 may provide user authentication, encryption, access authorization, tracking, Internet Protocol (IP) connectivity, and other access, calculation, modification, and/or functions. The control panels 105 may interface with the network 130 through wired and/or wireless communication links 132 to communication with one or more remote servers 145. The control panels 105 may perform communication configuration, adjustment, and/or scheduling for communication with the devices 115, or may operate under the control of a controller. In various examples, the control panels 105 may communicate—either directly or indirectly (e.g., through network 130)—with each other over wired and/or wireless communication links 134. Control panels 105 may communicate with a back end server (such as the remote servers 145)—directly and/or indirectly—using one or more communication links.

The control panels 105 may wirelessly communicate with the devices 115 via one or more antennas. Each of the control panels 105 may provide communication coverage for a respective geographic coverage area 110. In some examples, control panels 105 may be referred to as a control device, a base transceiver station, a radio base station, an access point, a radio transceiver, or some other suitable terminology. The geographic coverage area 110 for a control panel 105 may be divided into sectors making up only a portion of the coverage area. The communications system 100 may include control panels 105 of different types. There may be overlapping geographic coverage areas 110 for one or more different parameters, including different technologies, features, subscriber preferences, hardware, software, technology, and/or methods. For example, each control panel 105 may be related to one or more discrete structures (e.g., a home, a business) and each of the one more discrete structures may be related to one or more discrete areas. In other examples, multiple control panels 105 may be related to the same one or more discrete structures (e.g., multiple control panels relating to a home and/or a business complex).

The devices 115 may be dispersed throughout the communications system 100 and each device 115 may be stationary and/or mobile. A device 115 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), audio devices (e.g. speakers, surround sound system, etc.), a printer, a camera, and/or the like. A device 115 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The control panels 105 may wirelessly communicate with the sensors 150 via one or more antennas. The sensors 150 may be dispersed throughout the communications system 100 and each sensor 150 may be stationary and/or mobile. A sensor 150 may include and/or be one or more sensors that sense: proximity, motion, temperatures, humidity, sound level, smoke, security camera, structural features (e.g., glass breaking, window position, door position), time, light geolocation data of a user and/or a device, distance, biometrics, weight, speed, height, size, preferences, light, darkness, weather, time, system performance, and/or other inputs that relate to a security and/or an automation system. A device 115 and/or a sensor 150 may be able to communicate through one or more wired and/or wireless connections with various components such as control panels, base stations, and/or network equipment (e.g., servers, wireless communication points, etc.) and/or the like.

The communication links 125 shown in communications system 100 may include uplink (UL) transmissions from a device 115 to a control panel 105, and/or downlink (DL) transmissions, from a control panel 105 to a device 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 125 may transmit bidirectional communications and/or unidirectional communications. Communication links 125 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

In some embodiments, of communications system 100, control panels 105 and/or devices 115 may include one or more antennas for employing antenna diversity schemes to improve communication quality and reliability between control panels 105 and devices 115. Additionally or alternatively, control panels 105 and/or devices 115 may employ multiple-input, multiple-output (MIMO) techniques that may take advantage of multi-path, mesh-type environments to transmit multiple spatial layers carrying the same or different coded data.

While the devices 115 may communicate with each other through the control panel 105 using communication links 125, each device 115 may also communicate directly with one or more other devices via one or more direct communication links 134. Two or more devices 115 may communicate via a direct communication link 134 when both devices 115 are in the geographic coverage area 110 or when one or neither devices 115 is within the geographic coverage area 110. Examples of direct communication links 134 may include Wi-Fi Direct, BLUETOOTH®, wired, and/or, and other P2P group connections. The devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.1 lad, 802.11ah, etc. In other implementations, other peer-to-peer connections and/or ad hoc networks may be implemented within communications system 100.

A user of the automation system may request a personalized communication to be sent to another person using the control panel 105. The user may use a device 115 to request the communication. The control panel 105 may use one or more sensors 150 to determine if the recipient of the communication is proximate the geographic coverage area 110. Once the control panel 105 detects the recipient, the control panel 105 may deliver the communication via the control panel 105 or one or more devices 115 associated with the communications system 100.

Figure 2:
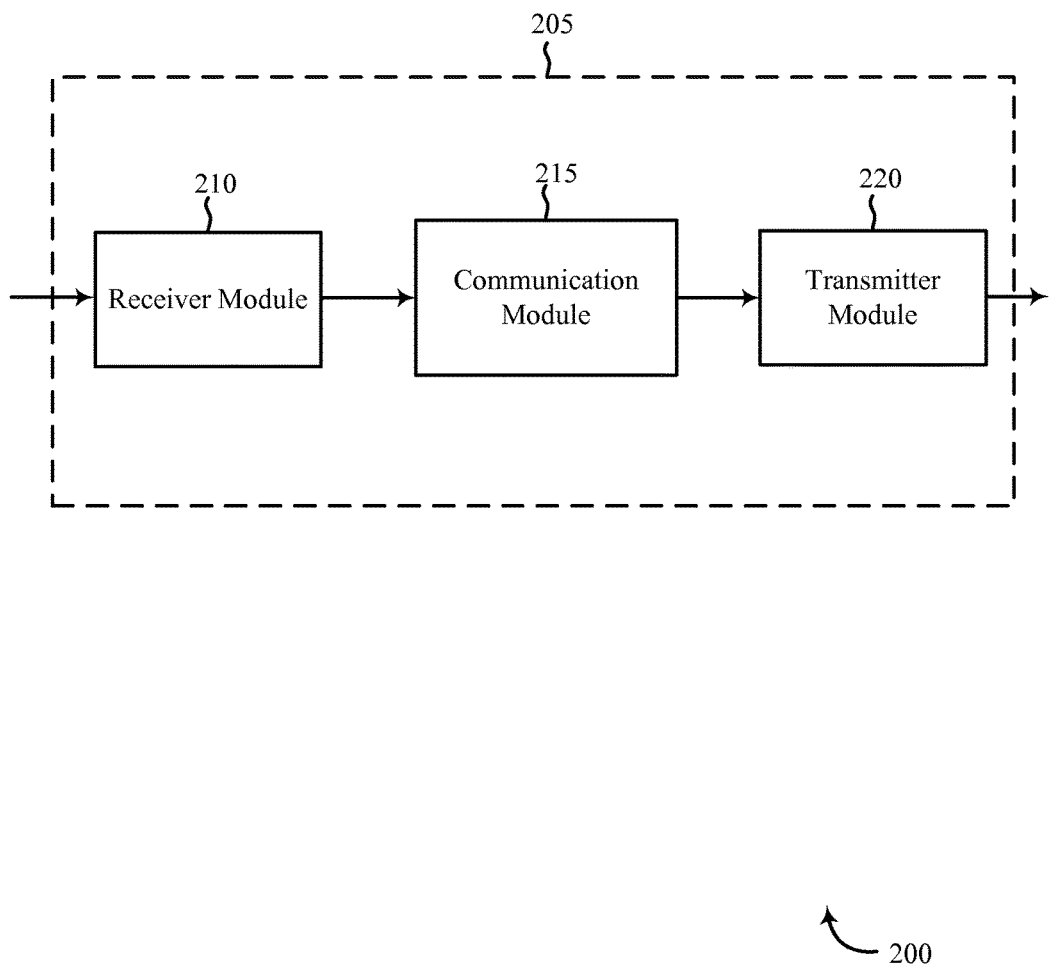
FIG. 2 shows a block diagram of a device relating to a security and/or an automation system, in accordance with various aspects of this disclosure.

FIG. 2 shows a block diagram 200 of a control panel 205 for use in electronic communication, in accordance with various aspects of this disclosure. The control panel 205 may be an example of one or more aspects of a control panel 105 described with reference to FIG. 1. The control panel 205 may include a receiver module 210, a communication module 215, and/or a transmitter module 220. The control panel 205 may also be or include a processor. Each of these modules may be in communication with each other—directly and/or indirectly.

The components of the control panel 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive one or more requests to send a communication or personalize a communication. Information may be passed on to the communication module 215, and to other components of the control panel 205.

The communication module 215 may customize and deliver one or more communications to personnel associated with the automation system. The communications may be specific to a user or may be intended for an occupant of a residence. The communication module 215 may have specific playback requests. For example, on a special occasion, the communication module 215 may play several different communications throughout the day to a specific user. Additionally, the communication module 215 may allow a user to communicate with personnel in the residence without the need for mobile devices. The personnel may comprise a cleaning service, a babysitter, a pet sitter, or the like. In some embodiments, the communication module 215 may be programmed to respond to different scenarios. For example, if the automation system is in babysitter mode and a master bedroom door opens, a communication may play to request the person to shut the door and not enter the master bedroom.

The transmitter module 220 may transmit the one or more signals received from other components of the control panel 205. The transmitter module 220 may transmit the communication. In some examples, the transmitter module 220 may be collocated with the receiver module 210 in a transceiver module.

Figure 3:
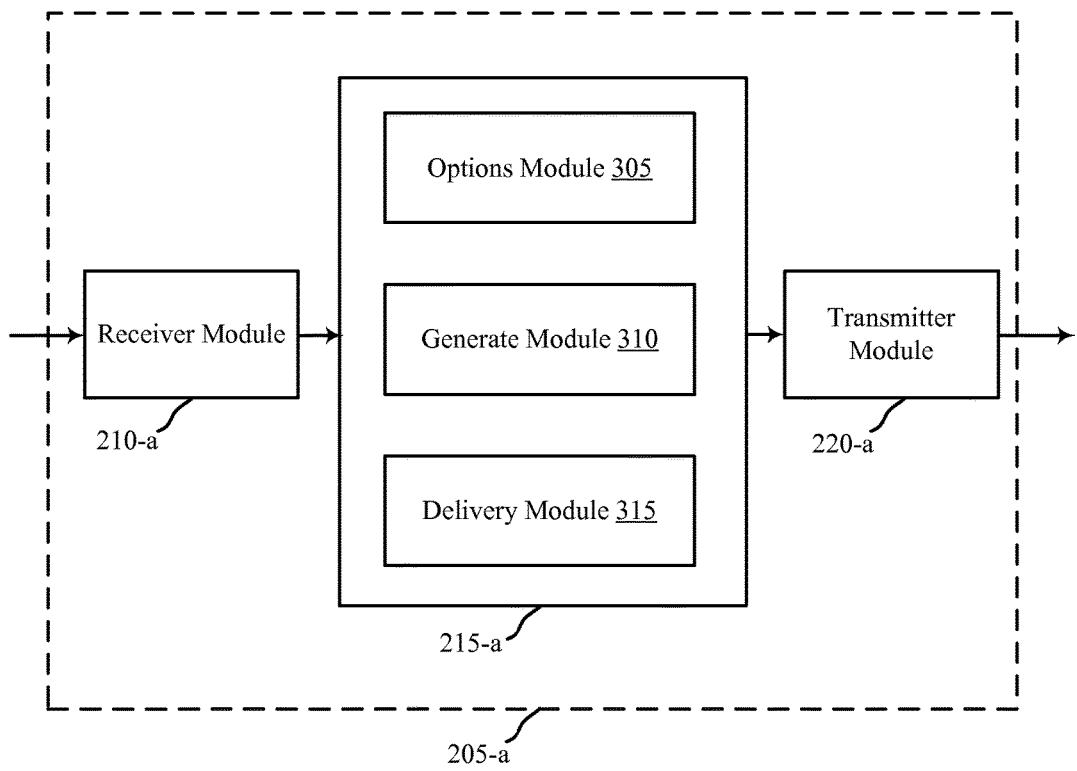
FIG. 3 shows a block diagram of a device relating to a security and/or an automation system, in accordance with various aspects of this disclosure.

FIG. 3 shows a block diagram 300 of a control panel 205-a for use in wireless communication, in accordance with various examples. The control panel 205-a may be an example of one or more aspects of a control panel 105 described with reference to FIG. 1. It may also be an example of a control panel 205 described with reference to FIG. 2. The control panel 205-a may include a receiver module 210-a, a communication module 215-a, and/or a transmitter module 220-a, which may be examples of the corresponding modules of control panel 205. The control panel 205-a may also include a processor. Each of these components may be in communication with each other. The communication module 215-a may include an options module 305, a generate module 310, and a delivery module 315. The receiver module 210-a and the transmitter module 220-a may perform the functions of the receiver module 210 and the transmitter module 220, of FIG. 2, respectively.

The options module 305 may provide one or more customizable options for a user to personalize a communication. The options module 305 may comprise delivery options, background music options, voice options, and the like. The options module 305 may additionally comprise volume levels, font options, audio options, and the like. For example, the communication may comprise a video, audio, text message, or the like. Input from the user may specify one or more ways to personalize the message using the options module 305. The text message may be personalized to comprise specific font. The audio message may be played in a different voice. The options module 305 may dictate text to the recipient in a generate or specified voice. The options module 305 may play a song in the background of a video or audio message. For example, a husband may wish to deliver a message to his wife on their anniversary wherein the message may comprise an audio message with the husband's voice and may wish the wife a happy anniversary after a selected song is played.

The generate module 310 may use the requests from the options module 305 and compile the communication. The generate module 310 may program one or more delivery parameters. The delivery parameters may comprise a specific recipient, time frame, or scenario. For example, a user may request a message to be played when a scenario occurs. The scenario may be playing a morning communication to an occupant when the coffee pot is started, or when a shower has been running too long or the like. The communications may be specific to a recipient. For example, the generate module 310 may program the communication to play when a specific recipient is proximate the automation system.

The delivery module 315 may deliver the message to the recipient based on the commands received from the generate module 310. For example, the delivery module 315 may alert a babysitter that a message is awaiting her at the control panel. The babysitter may use the control panel to play the message and, in some embodiments, the babysitter may be given the option to respond to the message. In other embodiments, if the recipient is a particular user of the automation system, the delivery module 315 may determine when the person is in the residence and deliver the message according to the specifications of the user. The person may be required to authenticate their identity before the automation system will deliver the message. In some embodiments, the initial delivery of the message may be displayed on the control panel and the recipient may be directed to one or more devices within the residence to receive the message. For example, the recipient may be directed to a television to receive a video message.

Upon delivery of the communication to the intended recipient, the delivery module 315 may allow the recipient the option of responding to the message, deleting the message, or saving the message. Additionally, in some instances, the delivery module 315 may send the requestor a notification that their communication was successfully delivered to the recipient.

Figure 4:
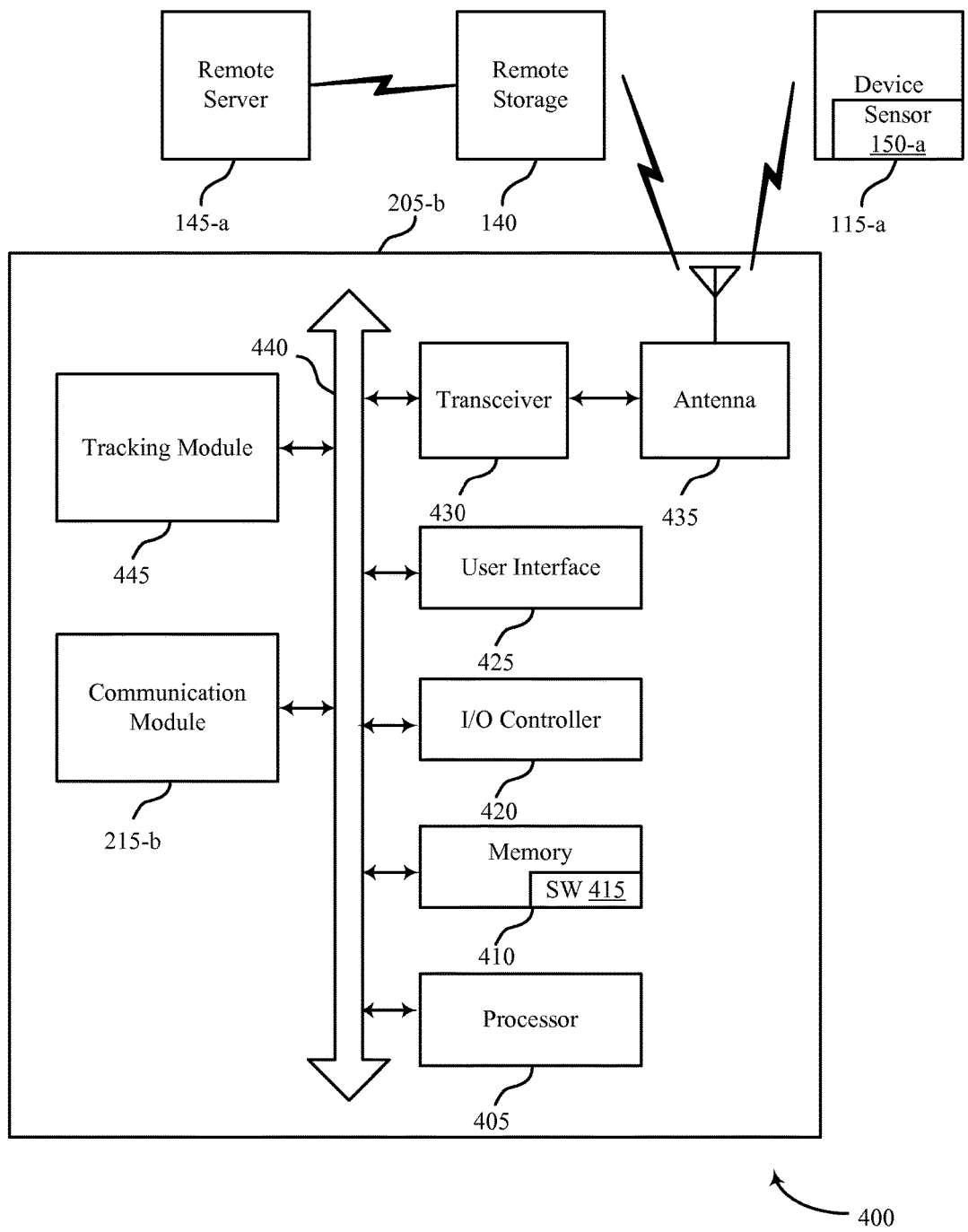
FIG. 4 shows a block diagram relating to a security and/or an automation system, in accordance with various aspects of this disclosure.

FIG. 4 shows a system 400 for use in personalized communication systems, in accordance with various examples. System 400 may include a control panel 205-*b*, which may be an example of the control panels 105 of FIG. 1. Control panel 205-*b* may also be an example of one or more aspects of control panels 205 and/or 205-*a* of FIGS. 2 and 3.

Control panel 205-*b* may include a tracking module 445. Control panel 205-*b* may also include a communication module 215-*b*, which may be an example of communication module 215, 215-*a* described with reference to FIGS. 2 and/or 3. In some embodiments, the terms a control panel and a control device are used synonymously.

Control panel 205-*b* may also include components for bi-directional voice and data communications including components for transmitting communications and components for receiving communications. For example, control panel 205-*b* may communicate bi-directionally with one or more of device 115-*a*, one or more sensors 150-*a*, remote storage 140, and/or remote server 145-*a*, which may be an example of the remote server of FIG. 1. This bi-directional communication may be direct (e.g., control panel 205-*b* communicating directly with remote storage 140) or indirect (e.g., control panel 205-*b* communicating indirectly with remote server 145-*a* through remote storage 140).

The tracking module 445 may track the location of one or more recipients of a communication based at least in part on delivery parameters as described above with reference to FIG. 3. For example, the tracking module 445 may track the presence of one or more recipients proximate a residence associated with the automation system. This may include tracking a device associated with the recipient, detecting when a recipients code is used to enter the residence and/or disable the automation system, or the like.

The communication module 215-*b* may generate one or more communications for a recipient based at least in part on personalization parameters. For example, the personalization parameters may comprise a recipient, a delivery medium, a delivery time, and the like. The communication module 215-*b* may work in conjunction with the tracking module 445 to accurately deliver the communications to the proper recipient. The communication module 215-*b* may deliver the communications via the control panel 205-*b* or one or more devices 115-*a* associated with the control panel 205-*b*.

Control panel 205-*b* may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of device 115-*a*, remote storage 140, and/or remote server 145-*a*. The transceiver module 430 may include a modem to modulate the packets and provide the modulated packets to the one or more antennas 435 for transmission, and to demodulate packets received from the one or more antenna 435. While a control panel or a control device (e.g., 205-*b*) may include a single antenna 435, the control panel or the control device may also have multiple antennas 435 capable of concurrently transmitting or receiving multiple wired and/or wireless transmissions. In some embodiments, one element of control panel 205-*b* (e.g., one or more antennas 435, transceiver module 430, etc.) may provide a direct connection to a remote server 145-*a* via a direct network link to the Internet via a POP (point of presence). In some embodiments, one element of control panel 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 150-*a* (e.g., motion, proximity, smoke, light, glass break, door, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of control panel 205-*b* (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., delivering personalized communications to a recipient at a control panel, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 can contain, among other things, the Basic Input-Output system (BIOS) which may control basic hardware and/or software operation such as the interaction with peripheral components or devices. For example, the tracking module 445 and/or the communication module 215-*b* to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the devices 115-*a* may include a single antenna 435, the devices 115-*a* may have multiple antennas 435 capable of concurrently transmitting and/or receiving multiple wireless transmissions.

Figure 5:
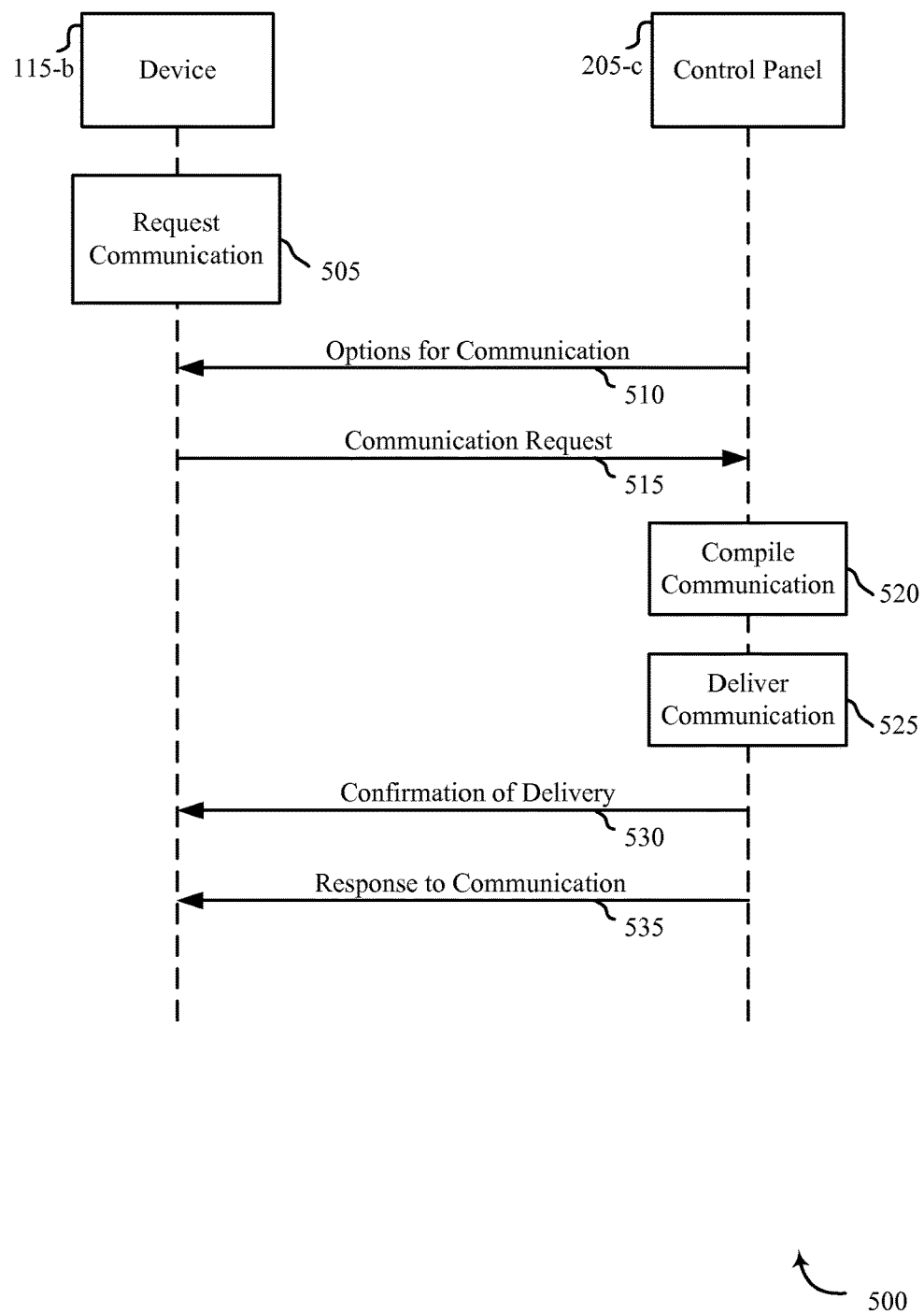
FIG. 5 shows a swim diagram relating to a security and/or an automation system, in accordance with various aspects of this disclosure

FIG. 5 shows a system 500 for use in personalized communication systems in security and/or automation systems, in accordance with various examples. System 500 may include a control panel 205-*c*, which may be an example of the control panels 105 of FIG. 1. Control panel 205-*c* may also be an example of one or more aspects of control panels 205 of FIGS. 2-4. Device 115-*b* may also be an example of one or more aspects of device 115 and/or 115-*a* of FIGS. 1 and 4. The device 115-*b* may be associated with a user of the security and/or automation system.

A user may use a device 115-*b* to request a communication 505. The communication may be intended for a recipient and may be delivered to the recipient via one or more features associated with an automation system. The request 505 may trigger the control panel 205-*c* to display options for the communication 510 to the user. The user may send the personalization and communication request 515 to the control panel 205-*c*.

In turn, the control panel 205-*c* may compile the communication 520. Compiling the communication 520 may comprise generating a text, audio, or visual communication based on the requesting parameters. The control panel 205-*c* may deliver the communication 525 to a recipient. The control panel 205-*c* may send a confirmation 530 to the device 115-*b* confirming the delivery of the communication. In some embodiments, the control panel 205-*c* may additionally send a response 535 to the communication.

Figure 6:
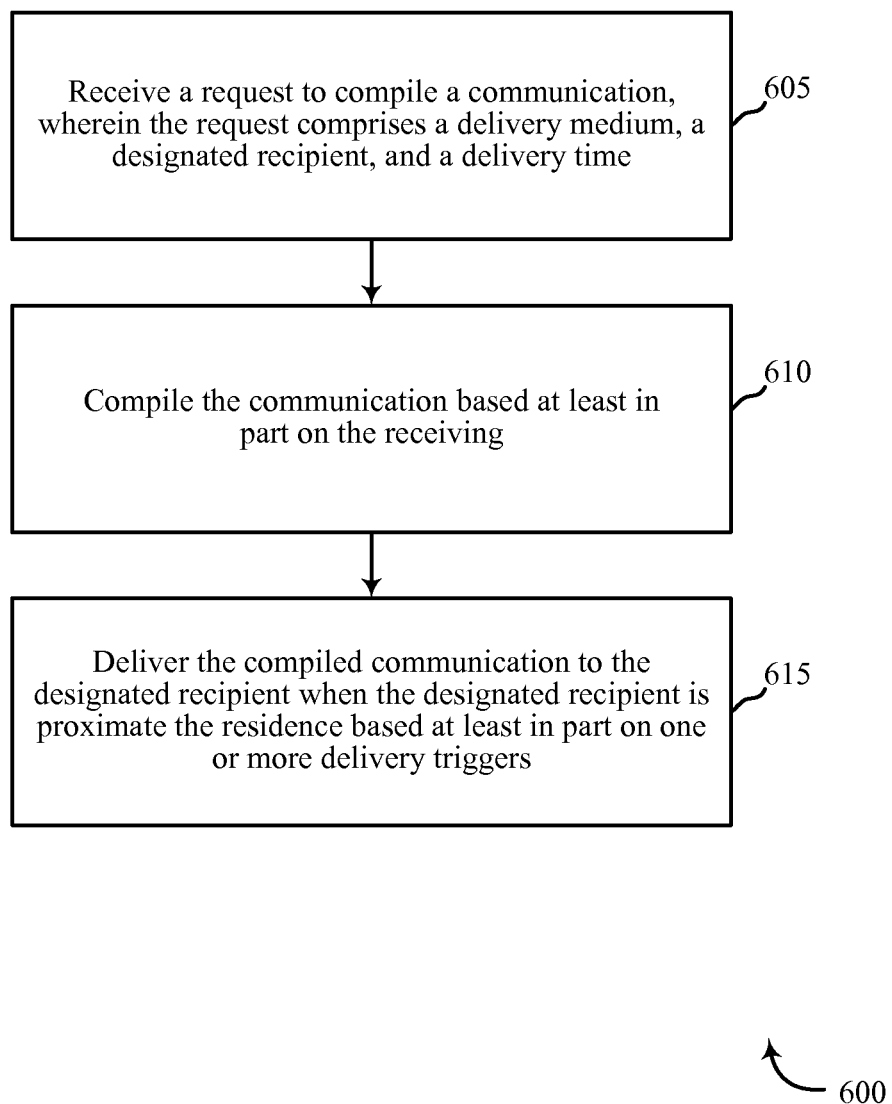
FIG. 6 is a flow chart illustrating an example of a method relating to a security and/or an automation system, in accordance with various aspects of this disclosure.

FIG. 6 is a flow chart illustrating an example of a method 600 for personalized communication systems, in accordance with various aspects of the present disclosure. For clarity, the method 600 is described below with reference to aspects of one or more of the communication module 215 described with reference to FIGS. 2-4, and/or aspects of one or more of the tracking module described with reference to FIG. 4. In some examples, a control panel may execute one or more sets of codes to control the functional elements of the control and/or a device associated with the control panel to perform the functions described below. Additionally or alternatively, the control panel may perform one or more of the functions described below using special-purpose hardware.

At block 605, the method 600 may include receiving a request to compile a communication, wherein the request comprises a delivery medium, a designated recipient, and a delivery time. The delivery medium may comprise one or more devices associated with an automation system. For example, the delivery medium may comprise a control panel, an audio system, a computer, a mobile device, a television, or the like. The designated recipient may comprise a user and/or occupant of a residence. The delivery time may comprise a predetermined time to deliver the message, or may be related to one or more scenarios. For example, the scenario may comprise a trigger to deliver the message. The trigger may comprise the arrival of the recipient at the premise associated with the automation system. The trigger may additionally be a response to one or more events. For example, if a child is showering too long, a message may play to get out of the shower. If babysitter has TV on during the children's bedtime routine, the user may wish a message to play to turn off the TV and for the TV to automatically turn off. A user may wish to deliver a message to a spouse upon the use of a coffee pot or other similar morning item.

The operation(s) at block 605 may be performed using the options module 305 described with reference to FIG. 3.

At block 610, the method 600 may include compiling the communication based at least in part on the receiving. Compiling the message may include retrieving one or more request associated with the communication. For example, the user may request the communication to include a photograph from a particular day or time. The control panel may access the request and retrieve the requested information. In another embodiment, the control panel may download one or more personalizations to compile the message such as a song, ringtone, audio, or some other personalized feature. The control panel may compile the communication using the personalization requests and program the communication to be delivered according to the user's request.

The operation(s) at block 610 may be performed using the generate module 310 described with reference to FIG. 3.

At block 615, the method 600 may include delivering the compiled communication to the designated recipient when the designated recipient is proximate the residence based at least in part on one or more delivery triggers. The recipient may need to be proximate the premise associated with the automation system to receive the message. This may allow a user to facilitate messaging a recipient when the recipient is proximate a residence. The recipient may be a user of the automation system and/or an occupant of the residence. The occupant may comprise a contractor and/or personnel performing a requested task and/or a guest of the residence. The delivery triggers may comprise one or more requests by the user. For example, the delivery trigger may comprise a predetermined time or a predetermined event. The predetermined event may comprise when a user of the automation system returns to the residence. The predetermined event may additionally comprise when a specific event occurs at the residence. For example, a communication may be played when an occupant enters an undesirable room, when the babysitter may have children up past bedtime, or the like.

The operation(s) at block 615 may be performed using the delivery module 315 and/or the tracking module 445 described with reference to FIGS. 3 and/or 4.

Thus, the method 600 may provide delivering personalized communications to a recipient relating to automation/security systems. It should be noted that the method 600 is just one implementation and that the operations of the method 600 may be rearranged or otherwise modified such that other implementations are possible.

Figure 7:
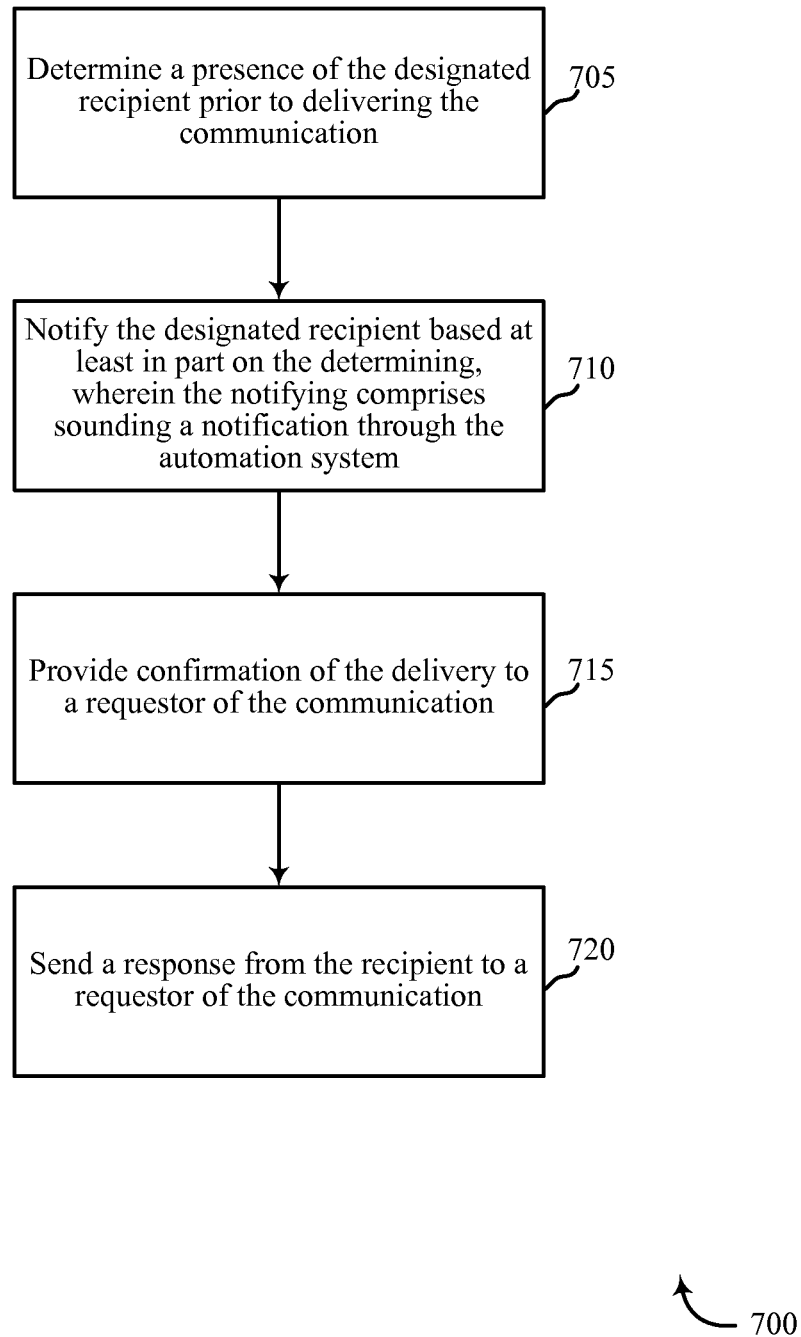
FIG. 7 is a flow chart illustrating an example of a method relating to a security and/or an automation system, in accordance with various aspects of this disclosure.

FIG. 7 is a flow chart illustrating an example of a method 700 for personalized communication systems, in accordance with various aspects of the present disclosure. For clarity, the method 700 is described below with reference to aspects of one or more of the communication module 215 described with reference to FIGS. 2-4, and/or aspects of one or more of the tracking module described with reference to FIG. 4. In some examples, a control panel may execute one or more sets of codes to control the functional elements of the control and/or a device associated with the control panel to perform the functions described below. Additionally or alternatively, the control panel may perform one or more of the functions described below using special-purpose hardware.

At block 705, the method 700 may include determining a presence of the designated recipient prior to delivering the communication. The presence may be detected by tracking the location of a mobile device associated with the recipient. The recipient may additionally be tracked by determining when a personalized key code is used to enter the residence. The recipient may also be identified using one or more security cameras with facial recognition. The mere presence of a person may also be identified even if the identity is unknown.

The operation(s) at block 705 may be performed using the tracking module 445 described with reference to FIG. 4.

At block 710, the method 700 may include notifying the designated recipient based at least in part on the determining, wherein the notifying comprises sounding a notification through the automation system. The notification may comprise an audio message using one or more speaker systems associated with the automation system. Additionally, a signal may be proximate the control panel and may alert the recipient to a pending message. The signal may be visual, audible, or audiovisual.

At block 715, the method 700 may include providing confirmation of the delivery to a requestor of the communication. The confirmation may be a ping message to the requestor alerting them that the communication has been displayed. The confirmation may additionally comprise an SMS message, an voicemail, an email, or a message retrieved from the control panel. If a security camera is proximate the delivery medium, the confirmation message may comprise footage of the recipient as the communication was delivered.

At block 720, the method 700 may include sending a response from the recipient to a requestor of the communication. After the recipient has received the message, the recipient may have the option of responding to the message. The responses may be generic and selectable from a list of options. For example, the response may consist of generic responses such as "thanks," "done," "got it," etc. The response may be sent directly to the requestor's device.

The operation(s) at block 720, 710, and/or 715 may be performed using the delivery module 315 described with reference to FIG. 3.

Thus, the method 700 may provide for delivering personalized communications to a recipient relating to automation/security systems. It should be noted that the method 700 is just one implementation and that the operations of the method 700 may be rearranged or otherwise modified such that other implementations are possible.

In some examples, aspects from two or more of the methods 600, 700 may be combined and/or separated. It should be noted that the methods 600, 700 are just example implementations, and that the operations of the methods 600, 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for a security and/or automation system for a residence, comprising:
   receiving a request to compile a communication from a requestor, wherein the request comprises a delivery medium, a designated recipient, and one or more delivery triggers, wherein the designated recipient is different from the requestor, and the designated recipient is an occupant of the residence;
   compiling the communication based at least in part on the receiving;
   determining a presence of a person proximate the residence during a predetermined time frame;
   upon determining the presence of the person, determining an identity of the person using one or more facial recognition techniques;
   authenticating the person as the designated recipient based at least in part on the identity of the person;
   receiving, from the requestor, one or more scenarios associated with the one or more delivery triggers;
   determining that the one or more scenarios are satisfied based at least in part on authenticating the person as the designated recipient;
   determining an occurrence of one or more delivery triggers based at least in part on determining that the one or more scenarios are satisfied;
   notifying the designated recipient based at least in part on the determining the occurrence of one or more delivery triggers, wherein the notifying comprises sounding a notification through the automation system;
   delivering the compiled communication to the designated recipient via the delivery medium; and
   providing confirmation of the delivering to the requestor of the communication.

2. The method of claim 1, wherein the one or more delivery triggers comprises a delivery time period.

3. The method of claim 1, further comprising: personalizing the communication based at least in part on one or more personalization parameters.

4. The method of claim 1, further comprising: receiving input to delete the communication.

5. The method of claim 1, further comprising: forwarding the communication to a device associated with the designated recipient.

6. The method of claim 1, further comprising: sending a response from the recipient to a requestor of the communication.

7. The method of claim 6, wherein the response is selected from a generic list of responses.

8. The method of claim 7, wherein the response is sent to a device associated with the requestor.

9. The method of claim 1, further comprising: playing the communication on a control panel associated with the automation system.

10. An apparatus for a security and/or automation system for a residence, comprising:
    a processor;
    memory in electronic communication with the processor; and
    instructions stored in the memory, the instructions being executable by the processor to:
    receive a request to compile a communication from a requestor, wherein the request comprises a delivery medium, a designated recipient, and one or more delivery triggers, wherein the designated recipient is different from the requestor, and the designated recipient is an occupant of the residence;
    compile the communication based at least in part on the receiving;
    determine a presence of a person proximate the residence during a predetermined time frame;
    upon determining the presence of the person, determining an identity of the person using one or more facial recognition techniques;
    authenticate the person as the designated recipient based at least in part on the identity of the person;
    receive, from the requestor, one or more scenarios associated with the one or more delivery triggers;
    determine that the one or more scenarios are satisfied based at least in part on authenticating the person as the designated recipient;
    determine an occurrence of one or more delivery triggers based at least in part on determining that the one or more scenarios are satisfied;
    notify the designated recipient based at least in part on the determining the occurrence of one or more delivery triggers, wherein the notifying comprises sounding a notification through the automation system;
    deliver the compiled communication to the designated recipient via the delivery medium; and
    provide confirmation of the delivering to the requestor of the communication.

11. A non-transitory computer-readable medium storing computer-executable code, the code executable by a processor to:
    receive a request to compile a communication from a requestor, wherein the request comprises a delivery medium, a designated recipient, and one or more delivery triggers, wherein the designated recipient is different from the requestor, and the designated recipient is an occupant of the residence;
    compile the communication based at least in part on the receiving;
    determine a presence of a person proximate the residence during a predetermined time frame;
    upon determining the presence of the person, determining an identity of the person using one or more facial recognition techniques;
    authenticate the person as the designated recipient based at least in part on the identity of the person;
    receive, from the requestor, one or more scenarios associated with the one or more delivery triggers;
    determine that the one or more scenarios are satisfied based at least in part on authenticating the person as the designated recipient;
    determine an occurrence of one or more delivery triggers based at least in part on determining that the one or more scenarios are satisfied;
    notify the designated recipient based at least in part on the determining the occurrence of one or more delivery triggers, wherein the notifying comprises sounding a notification through the automation system;
    deliver the compiled communication to the designated recipient via the delivery medium; and
    provide confirmation of the delivering to the requestor of the communication.

* * * * *